United States Patent
Chen

(10) Patent No.: US 8,678,293 B2
(45) Date of Patent: Mar. 25, 2014

(54) FLEXIBLE PUBLIC TRANSPORTATION CARD WITH DISPLAY FUNCTION

(75) Inventor: Chao-Chin Chen, Hsinchu (TW)

(73) Assignee: AniCa Corporation, New Taipei (TW)

(*) Notice: Subject to any disclaimer, the term of this patent is extended or adjusted under 35 U.S.C. 154(b) by 42 days.

(21) Appl. No.: 13/489,311

(22) Filed: Jun. 5, 2012

(65) Prior Publication Data
US 2013/0008967 A1   Jan. 10, 2013

(30) Foreign Application Priority Data
Jul. 4, 2011  (TW) .............................. 100212238 U

(51) Int. Cl.
*G06K 19/06* (2006.01)

(52) U.S. Cl.
USPC ......................................................... 235/492

(58) Field of Classification Search
USPC ....................................................... 235/492
See application file for complete search history.

(56) References Cited

U.S. PATENT DOCUMENTS 7,954,724 B2 *  6/2011  Poidomani et al. ........... 235/492
8,429,085 B2 *  4/2013  Faith et al. ....................... 705/65

FOREIGN PATENT DOCUMENTS

TW           200604955          2/2006

* cited by examiner

*Primary Examiner* — Jamara Franklin
(74) *Attorney, Agent, or Firm* — Rabin & Berdo, P.C.

(57) ABSTRACT

A flexible public transportation card with display function is disclosed. The flexible public transportation card with display function comprises a first card body, a second card body and a flexible electronic system. The flexible electronic system is disposed between the first card body and the second card body. The flexible electronic system comprises a flexible display, a display circuit, a communication interface, a power generator and a capacitor. The display circuit is electrically connected to the flexible display. The communication interface receives a wireless signal. The power generator is electrically connected to the display circuit and the communication interface, and generates electricity according to the wireless signal. The capacitor stores the electricity generated by the power generator for providing the display circuit with the stored electricity, such that the flexible display displays a frame. The capacitance of the capacitor ranges between 0.1 and 20 microfarads.

10 Claims, 1 Drawing Sheet

FLEXIBLE PUBLIC TRANSPORTATION CARD WITH DISPLAY FUNCTION

This application claims the benefit of Taiwan application Ser. No. 100212238, filed Jul. 4, 2011, the subject matter of which is incorporated herein by reference.

BACKGROUND OF THE INVENTION

1. Field of the Invention

The invention relates in general to a flexible card with display function, and more particularly to a flexible public transportation card with display function.

2. Description of the Related Art

Along with the advance in technology, many transactions and payments are gradually processed by conventional integrated circuit (IC) cards. The IC cards are such as credit cards, finance cards, telephone cards and so on. According to the difference in communication interface, the IC cards may have three types, namely, the contact mode, contactless mode, and the dual interface mode.

The IC cards may further be divided into two categories, namely, the smart card and the memory card. The smart card has a control mechanism containing an 8-bit, 16-bit or 32-bit micro-processor with appended encryption processing such as DES, RSA. The memory card contains a memory and a simple logic circuit. The memory is such as a read-only memory (ROM) or a non-volatile memory, and has a capacity of such as 4K, 8K, 16K . . . 1M bytes.

The contactless and dual interface mode IC cards may further be divided into three categories according to the different communication protocols, namely, the type A, the type B and the Felica type. The type A and the type B are conformed to the proximity ISO 14443 standard, and the Felica type is conformed to the Sony Corporation standard, and the type A. type B and the Felica type all have a telecommunication distance of about 0-10 cm. The dual interface mode, being a combination of the contact and contactless modes, may further be divided into two categories, namely, the single chip type and multiple chip type.

The conventional smart card with display function comprises a display, an antenna, a communication interface, a micro-processor, a display driving circuit, a boost circuit, a rectification voltage-stabilizing circuit, a non-volatile memory, a contactless RF smart card integrated circuit and a contact smart card. The IC communication interface may be a contactless radio frequency (RF) interface or a contact communication interface.

For the contactless communication interface, the antenna is disposed in the contactless RF smart card integrated circuit. The antenna receives an RF signal from an external card reader. The communication interface performs RF demodulation on a coupled signal. On the other hand, the rectification voltage-stabilizing circuit generates a DC power from the coupled signal and further supplies the internal elements with necessary voltages.

After the micro-processor receives a signal from the communication interface, data is stored in the memory, and the display driving circuit may further convert the data into a display driving signal for the user to check. The micro-processor may also send a response signal to the antenna via the communication interface, and the antenna further sends the signal to the external card reader. The boost circuit converts the DC power generated by the rectification voltage-stabilizing circuit into higher voltages, and the display driving circuit further converts the higher voltages into a display driving signal.

However, the entire operation of the smart card with display function from the start of communication to the end of display frame takes at least 1 second. In the field of communication with the time being pressing, only 0.2 to 0.6 seconds are available for generating electricity from the electromagnetic induction with an external card reader. Within such a short power supply time, the smart card with display function is unable to complete system operation and frame display.

SUMMARY OF THE INVENTION

The invention is directed to a flexible public transportation card with display function. Through the design of capacitor, the flexible public transportation card with display function is quickly charged within a limited time to generate required electricity for completing system operation and frame display.

According to one embodiment of the present invention, a flexible public transportation card with display function is disclosed. The flexible public transportation card with display function comprises a first card body, a second card body and a flexible electronic system. The flexible electronic system is disposed between the first card body and the second card body. The flexible electronic system comprises a flexible display, a display circuit, a communication interface, a power generator and a capacitor. The display circuit is electrically connected to the flexible display. The communication interface receives a wireless signal. The power generator is electrically connected to the display circuit and the communication interface, and generates electricity according to the wireless signal. The capacitor stores the electricity generated by the power generator for providing the display circuit with the stored electricity, such that the flexible display displays a frame. The capacitance of the capacitor ranges between 0.1 and 20 microfarads.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
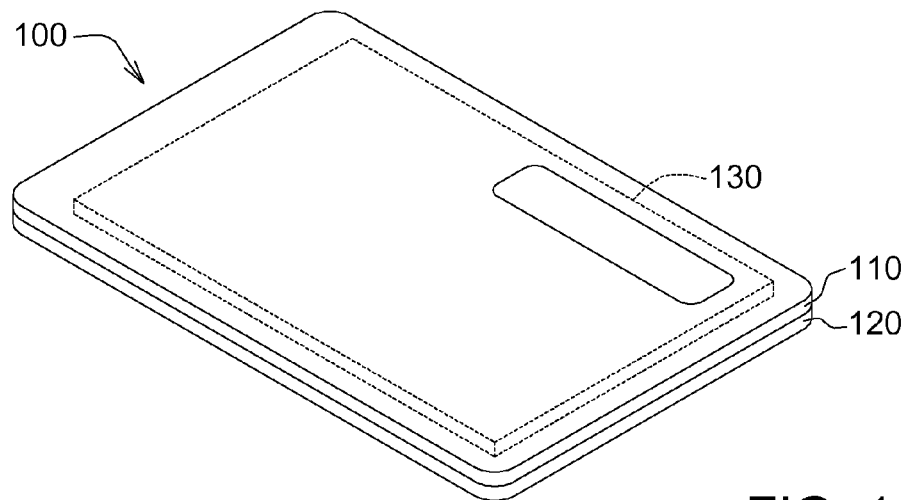
FIG. 1 shows a 3D diagram of a flexible public transportation card with display function according to one embodiment of the disclosure.

Referring to FIG. 1, a 3D diagram of a flexible public transportation card with display function according to one embodiment of the disclosure is shown. The flexible public transportation card with display function 100 comprises a first card body 110, a second card body 120, and a flexible electronic system 130 disposed between the first card body 110 and the second card body 120.

The flexible public transportation card with display function 100 is such as an integrated circuit (IC) card. In addition, the flexible public transportation card with display function 100 may incorporate other functions. For example, the flexible public transportation card with display function 100 may be used in a stored value card, a password generator card, a membership card, VIP card, an access card, an electronic key, a passport, an ID card, a label, finance card, a credit card, as advertisement card, an entertainment card, a name card, a card type computer, a card type calculator, a card type e-book, a card type game machine or a physiological signal detection card. The stored value card is such as an e-purse, a point card, a transportation stored value card, a telephone card or a cash card. The transportation card is such as a transportation stored value card, a transportation ticket information card or a ticket card. The label is such as a price label or a security label.

Figure 2:
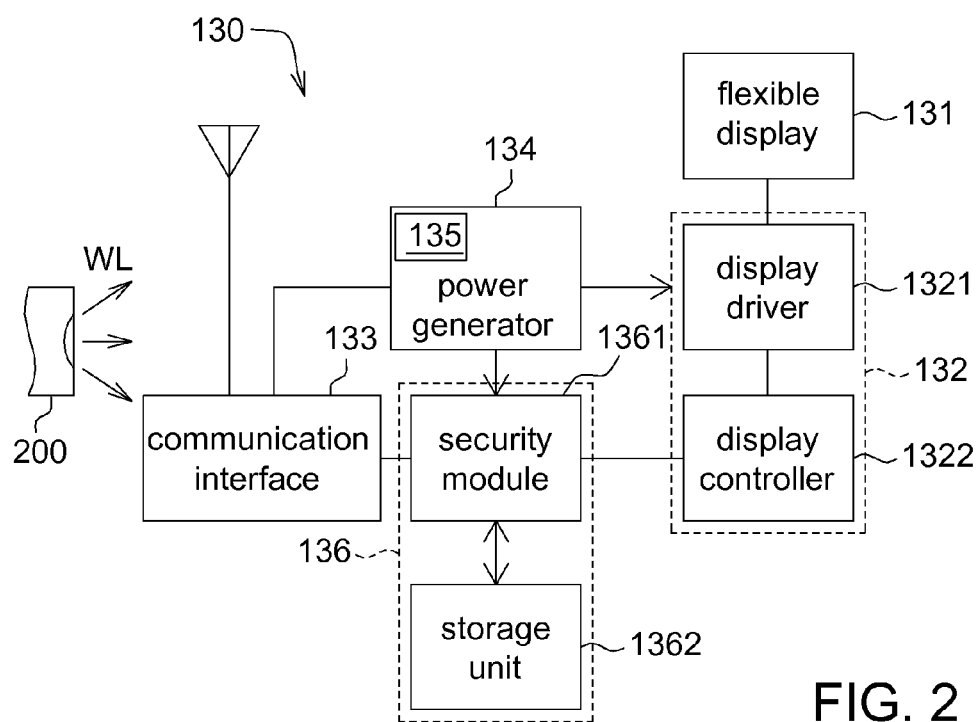
FIG. 2 shows a functional block diagram of a flexible electronic system of FIG. 1.

Referring to FIG. 2, a functional block diagram of a flexible electronic system of FIG. 1 is shown. The flexible electronic system 130, such as a flexible thin-type electronic system, may comprise a communication interface 133, a power generator 134, a capacitor 135, a flexible display 131, a display circuit 132 and a smart card integrated circuit 136.

The communication interface 133 is connected to the display circuit 132 via the smart card integrated circuit 136 for receiving a wireless signal WL. The communication interface 133 is connected to the display circuit 132 via the smart card integrated circuit 136, and comprises an antenna. The smart card integrated circuit 136 has, for example, three types, namely, the contact type, the non-contact type, and the composite type. Moreover, the smart card integrated circuit 136 is conformed to such as the ISO7816 standard, the ISO/IEC14443 standard, the ISO15693 standard, the ISO/IEC18000 standard, the ISO18185 standard, the EMV standard, the EMV Contactless standard, the MIFARE standard or the FELICA standard.

The power generator 134 connects the display circuit 132, the communication interface 133 and the smart card integrated circuit 136. The power generator 134 receives a wireless signal WL via the communication interface 133, and generates an electricity (not illustrated) according to the wireless signal WL (such as by way of electromagnetic induction). The wireless signal WL is such as a wireless radio frequency (RF) signal.

The power generator 134 further comprises a DC/DC converter (not illustrated). The DC/DC converter converts a DC voltage into a working voltage required by the display circuit 132.

The capacitor 135 stores the electricity generated by the power generator 134. The capacitor 135 has sufficient capacity. Within the transient time of communication between the flexible transportation card 100 and the external card reader 200, the capacitor 135 stores sufficient electricity and provides the stored electricity to power the display circuit 132 for maintaining normal operations. In one embodiment, the capacitance of the capacitor 135 ranges between 0.1 and 20 microfarads (mF). Even when the flexible public transportation card with display function 100 is outside the electromagnetic induction range of the external card reader 200 such that the power generator 134 becomes unable to generate electricity, the electricity stored in the capacitor 135 still affords to assure the normal operations of the flexible public transportation card with display function 100. When the capacitance of the capacitor 135 ranges between 0.1 and 20 mF (preferably but not restrictively, between 0.1 and 5 mF), within the transient time of communication between the flexible transportation card 100 and the external card reader 200, the capacitor 135 may be full charged with electricity to accumulate sufficient voltage.

In addition, the capacitor 135 may be separately manufactured and then integrated into the power generator 134. The thickness of the capacitor 135 may be less than or equal to 0.5 mm (mm). Under such circumstances, the flexible public transportation card with display function 100 is still conformed to the specification of standard card thickness. Furthermore, despite that the capacitance of the capacitor 135 of the present embodiment of the disclosure is as large as 20 mF, the thickness of the capacitor 135 would not affect the thickness of the flexible public transportation card with display function 100 being conformed to the specification of standard card thickness.

Furthermore, during the process of connection between the flexible public transportation card with display function 100 and the external card reader 200, some electricity generated by the power generator 134 is provided to maintain the normal operations of the display circuit 132. Meanwhile, some other electricity generated by the power generator 134 is stored in the capacitor 135. When the flexible public transportation card with display function 100 is outside the electromagnetic induction range of the external card reader 200 so that the power generator 134 is unable to generate electricity, the electricity stored in the capacitor 135 is provided to maintain the normal operations of the display circuit 132.

The flexible display 131 has flexibility, and the normal function of the flexible display 131 will not be affected when the flexible display 131 is bent along with the first card body 110 and the second card body 120.

The flexible display 131, having bi-stable or multi-stable characteristics, is able to permanently or temporarily maintain the display contents despite having no power supply. For example, the flexible display 131 is such as an electrophoretic display, a cholesterol liquid crystal display, a liquid crystal display, a bi-stable display or a multi-stable display. Moreover, the flexible display 131 may further be a flexible organic light-emitting diode (OLED) display, a flexible light emitting diode (LED) display or a flexible liquid crystal display. Additionally, the flexible display 131 may further be a segment type display, a dot matrix type display or a pattern type display.

Moreover, the backplane of the flexible display 131 is such as a flexible printed circuit (FPC). The flexible printed circuit is made from such as FR4, FR5, polyimide (PI), polyethylene terephthalate (PET), PVC or polyethylene naphthalateglycol (PEN). In addition, the backplane of the flexible display 131 may further be formed by such as organic thin film transistors (OTFT). Moreover, the backplane of the flexible display 131 may further be formed by way of printing, silver colloid, carbon ink printing or circuit etching.

The display circuit 132 is electrically connected to the flexible display 131. The display circuit 132 and the smart card integrated circuit 136 share all or a part of integrated circuits, or are disposed on single integrated circuit.

The display circuit 132 connects the flexible display 131, and comprises a display driver 1321 and a display controller 1322. The display driver 1321 is connected to the flexible display 131, and used for driving the flexible display 131. The display controller 1322 is connected to the display driver 1321 and the smart card integrated circuit 136, and used for controlling the display driver 1321. The electricity required by the display controller 1322 is provided from the electricity stored in the capacitor 135, and is sufficient for the flexible display 131 to display frames.

The smart card integrated circuit 136 executes a security verification, and only when the security verification is successful, the communication interface 133 is allowed to communicate with the display circuit 132 via the smart card integrated circuit 136. The smart card integrated circuit 136 comprises a security module 1361 and a storage unit 1362. The security module 1361 executes a security verification to prevent the invasion of the hackers, and only when the security verification is successful, the data of the storage unit 1362 is accessed.

Both the first card body 110 and the second card body 120 are made from such as PVC, and have flexibility.

The first card body 110 and the second card body 120 are adhered by such as an adhesive material. The gaps between the first card body 110 and the second card body 120 and the flexible electronic system 130 are filled up with an adhesive material. The adhesive material is such as a thermosetting adhesive or a mixture of several curing adhesives. Window and trench may be pre-formed on the first card body 110 and the second card body 120. The first card body 110 and the second card body 120 are, for example, single-layered or multi-layered structures. Moreover, the first card body 110 and the second card body 120 may be pre-bonded, and then the pre-bonded body is molded by way of injection molding. Alternatively, the first card body 110 and the second card body 120 are directly bonded together. The first card body 110 and the second card body 120 are, for example, respectively disposed on an upper side and a lower side. The card body disposed on the side with display function is a transparent card body such as a full transparent card body or a partial transparent card body for allowing the light of the flexible display of the flexible electronic system 130 to pass through.

Patterns may be formed on the surfaces or inner layers of the first card body 110 and the second card body 120 by way of printing or thermal transferring. Respective protection layers may be coated on the surfaces of the first card body 110 and the second card body 120 to protect the card bodies or the printing patterns thereof. Preferably but not restrictively, the first card body 110 and the second card body 120 are bonded together using the cold pressing technology using such as a thermosetting adhesive, an electromagnetic wave curing adhesive, or a mixture of two or more than two curing adhesives. The operating temperature is below 105° C. to avoid the parts of the flexible electronic system 130 being over-heated and damaged.

The flexible public transportation card with display function 100 may further comprise a printing layer, such as located on the outer side of at least one of the first card body 110 and the second card body 120 or the inner side of at least one of the first card body 110 and the second card body 120. In addition, a protection layer may be coated on the outer side of the first card body 110 or the second card body 120. The hardness of the protection layer ranges, for example, between 2H and 8H.

Through the design of capacitor, the flexible public transportation card with display function disclosed in the above embodiments of the disclosure is quickly charged within a limited time to generate required electricity for completing system operation and frame display.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A flexible public transportation card with display function, comprising:
    a first card body;
    a second card body;
    a flexible electronic system disposed between the first card body and the second card body, wherein the flexible electronic system comprises:
        a flexible display;
        a display circuit connecting the flexible display;
        a communication interface for receiving a wireless signal;
        a power generator for connecting the display circuit and the communication interface and generating electricity according to the wireless signal; and
        a capacitor storing the electricity generated by the power generator for providing power to the display circuit using the stored electricity, such that the flexible display displays a frame; and
    a smart card integrated circuit via which the communication interface is connected to the display circuit,
    wherein the smart card integrated circuit executes a security verification, and only when the security verification is successful, the communication interface is allowed to communicate with the display circuit through the smart card integrated circuit; and
    wherein, a capacitance of the capacitor rangess between 0.1 and 20 microfarads (mF).

2. The flexible public transportation card with display function according to claim 1, wherein the power generator receives a radio frequency (RF) signal through the communication interface, and provides the flexible electronic system with required working electricity according to the RF signal.

3. The flexible public transportation card with display function according to claim 1, wherein the smart card integrated circuit comprises:
    a security module for executing the security verification; and
    a storage unit having data which is allowed to be accessed only when the security verification is successful.

4. The flexible public transportation card with display function according to claim 1, wherein the display circuit comprises:
    a display driver connecting the flexible display for driving the flexible display; and
    a display controller connecting the display driver for the smart card integrated circuit and controlling the display driver.

5. The flexible public transportation card with display function according to claim 1, wherein the display circuit and the smart card integrated circuit share all or a part of integrated circuits, or are disposed on single integrated circuit.

6. The flexible public transportation card with display function according to claim 1, wherein the first card body and the second card body are bonded using a cold pressing technology.

7. The flexible public transportation card with display function according to claim 1, wherein the flexible display has bi-stable or multi-stable characteristics.

8. The flexible public transportation card with display function according to claim 1, wherein the flexible display is an electrophoretic display, a cholesterol liquid crystal display, a liquid crystal display, a bi-stable liquid crystal display or a multi-stable liquid crystal display.

9. The flexible public transportation card with display function according to claim 1, wherein the flexible display is a flexible organic light-emitting diode (OLED) display, a flexible light-emitting diode (LED) display or a flexible liquid crystal display.

10. The flexible public transportation card with display function according to claim 1, wherein the thickness of the capacitor is less than or equal to 0.5 mm.

* * * * *